(12) United States Patent
Gobin et al.

(10) Patent No.: US 12,124,815 B2
(45) Date of Patent: Oct. 22, 2024

(54) DIGITAL SIGNAL PROCESSING DEVICE

(71) Applicants: STMicroelectronics (Grenoble 2) SAS, Grenoble (FR); STMicroelectronics (Alps) SAS, Grenoble (FR)

(72) Inventors: Pierre Gobin, Seyssinet-Pariset (FR); Jeremy Ribeiro De Freitas, Coublevie (FR)

(73) Assignees: STMicroelectronics (Grenoble 2) SAS, Grenoble (FR); STMicroelectronics (Alps) SAS, Grenoble (FR)

( * ) Notice: Subject to any disclaimer, the term of this patent is extended or adjusted under 35 U.S.C. 154(b) by 254 days.

(21) Appl. No.: 17/747,101

(22) Filed: May 18, 2022

(65) Prior Publication Data

US 2022/0374201 A1    Nov. 24, 2022

(30) Foreign Application Priority Data

May 21, 2021  (FR) ...................................... 2105332

(51) Int. Cl.
*G06F 7/548* (2006.01)
*G06F 7/523* (2006.01)
*G06F 7/544* (2006.01)

(52) U.S. Cl.
CPC .............. *G06F 7/544* (2013.01); *G06F 7/523* (2013.01)

(58) Field of Classification Search
CPC ........... G06F 7/544; G06F 7/523; G06F 7/548
USPC ....................................................... 318/781
See application file for complete search history.

(56) References Cited

U.S. PATENT DOCUMENTS

| 6,026,420 | A | 2/2000 | DesJardins et al. |
| 7,032,162 | B1* | 4/2006 | Dhamankar ........ H03M 13/158 |
| | | | 714/784 |
| 10,461,777 | B2* | 10/2019 | Ilani .................. H03M 13/1545 |
| 2014/0095572 | A1* | 4/2014 | Bahary ................ G06F 7/5443 |
| | | | 708/620 |
| 2017/0187391 | A1* | 6/2017 | Ilani .................. H03M 13/1545 |
| 2017/0308355 | A1* | 10/2017 | Drane ..................... G06F 7/483 |

(Continued)

OTHER PUBLICATIONS

Reynolds, Gavin S., "Investigation of different methods of fast plynomial evaluation," MSc in High Performance Computing, The University of Edinburgh, Sep. 2010, 67 pages.

(Continued)

*Primary Examiner* — Gabriel Agared
(74) *Attorney, Agent, or Firm* — Slater Matsil, LLP (57) ABSTRACT

A digital signal processor includes K first electronic circuits. The first inputs receive K groups of G successive coefficients of a polynomial. The polynomial are of degree N with N+1 coefficients, where K is a sub-multiple of N+1 greater than or equal to two and G is equal to (N+1)/K. The first electronic circuits are configured to simultaneously implement K respective Horner methods and deliver K output results. A second electronic circuit includes a first input configured to successively receive the output results of the first electronic circuits starting with the output result of the first electronic circuit having processed the highest rank coefficient of the coefficients. A second input is configured to receive a variable X and the second electronic circuit is configured to implement a Horner method and deliver a value of the polynomial for the variable X on the output of the second electronic circuit.

20 Claims, 4 Drawing Sheets

(56) References Cited

U.S. PATENT DOCUMENTS

2018/0097528 A1* 4/2018 Ilani ............... H03M 13/1545
2018/0219560 A1* 8/2018 Brueggen ......... H03M 13/1565

OTHER PUBLICATIONS

Zhang, Xiaodong et al., "Parallel Algorithms for Some Algebraic Operations on Polynomial Equations," Mathl Comput. Modelling, vol. 13, No. 9, May 1990, pp. 89-99.

* cited by examiner

DIGITAL SIGNAL PROCESSING DEVICE

CROSS-REFERENCE TO RELATED APPLICATIONS

This application claims priority to French Application No. 2105332, filed on May 21, 2021, which application is hereby incorporated herein by reference.

TECHNICAL FIELD

The present disclosure relates generally to the field of circuits for signal processing and, in particular embodiments, to electronic circuits for the evaluation of polynomials.

BACKGROUND

The Horner algorithm, also called the Ruffini-Horner algorithm, allows evaluating polynomials, that is, calculating a value of a polynomial for a numerical value of its variable.

Conventionally, a processing circuit for the Horner algorithm comprises a circuit dedicated to the implementation of an elementary operation repeated during several iterations.

The dedicated circuit typically comprises a first input to successively receive all coefficients of the polynomial and a second input to always receive the same numerical value of the variable.

The dedicated circuit is configured to implement the elementary operation which provides for successively adding each new coefficient of the polynomial to a result of a previous iteration then multiplying a result of the addition by the numerical value of the variable at each iteration.

This dedicated circuit evaluates a polynomial in a large number of iterations, where the greater the number of iterations is, the greater the degree of the polynomial. A calculation time for the evaluation of the polynomial by the circuit is mainly dependent on the degree of the polynomial.

Such a dedicated circuit has the drawback of being relatively slow, particularly if the degree of the polynomial is high.

There is therefore a need for an electronic device allowing accelerating the evaluation of polynomials.

SUMMARY

According to one aspect, a device for determining the value of a polynomial of variable X is proposed, the polynomial being of degree N with N+1 coefficients.

The device comprises K first electronic circuits respectively having K first inputs respectively intended to receive K groups of G successive coefficients of the polynomial, K being a sub-multiple of (N+) greater than or equal to two, G being equal to (N+1)/K.

This polynomial of degree N, with (N+1) multiple of K, can be an initial polynomial for which it is desired to determine the value if this initial polynomial is actually of degree N, or else the initial polynomial of degree N0 supplemented with terms of higher degrees to reach the degree N, but affected by zero coefficients, if (N0+1) is not a multiple of K.

The ranks of the coefficients within each group are mutually offset by K starting with the highest rank coefficient in said group.

The K ranks of the K coefficients simultaneously received on the K first inputs are mutually offset by one.

The first circuit comprises K second inputs intended to receive the variable $X^K$.

The first circuit also comprises K outputs.

The K first circuits are configured to simultaneously implement K respective Horner methods and deliver K output results on the K outputs.

Furthermore, the device comprises a second electronic circuit having a first input for successively receiving the output results of the K first circuits, starting with the output result of the first circuit having processed the highest rank coefficient.

The second circuit also has a second input to receive the variable X.

The second circuit also comprises an output.

The second circuit is configured to implement the Horner method and deliver the value of said polynomial on the output thereof.

Thus, the first K circuits in combination with the second circuit allow evaluating a polynomial in a number of iterations less than the degree N of the polynomial.

In particular, the K first circuits allow simultaneously implementing the K Horner methods on sub-polynomials of the polynomial. More specifically, the polynomial of degree N is subdivided into K sub-polynomials of degree (N+1)/K−1. The K first circuits allow simultaneously obtaining K evaluation results of these K sub-polynomials.

This allows reducing the number of clock strokes required to calculate the evaluation of the polynomial. Indeed, the number of clock strokes is divided by a factor close to K.

The second circuit then allows completing the evaluation of the polynomial by implementing the Horner algorithm once again from the K results of evaluation of the sub-polynomials, which allows obtaining the value of the polynomial for the value of the variable X.

According to one embodiment, each first circuit comprises a first adder having a first input connected to the first input of the first corresponding circuit.

The first adder has an output connected to the output of the first corresponding circuit.

The output of the first adder is looped back onto a first input of a first multiplier.

The first multiplier has a second input connected to the second input of the first corresponding circuit.

The output of the first multiplier is connected to the second input of the first adder.

According to one embodiment, the second circuit comprises a second adder having a first input connected to the first input of the second circuit.

The second adder has an output connected to the output of the second circuit.

The output of the second adder is looped back onto a first input of a second multiplier.

The second multiplier has a second input connected to the second input of the second circuit.

The output of the second multiplier is connected to the second input of the second adder.

Thus, each of the K first circuits and the second circuit can have the same structure comprising a multiplier and an adder, which allows simplifying the design of the device and being able in certain cases, such as for example within a signal processing processor, to use one of the first circuits as a second circuit.

Thus, according to another aspect, a signal processing processor is proposed incorporating the device as defined above, wherein the second circuit is one of the K first circuits.

Thus, such a processor allows removing a silicon surface dedicated to the second circuit by reusing one of the K first circuits to perform the calculations of the second circuit.

According to yet another aspect, a servo-control system is proposed, comprising a servo-control loop integrating a signal processing processor as defined above, connected to an electric motor.

Thus, the servo-control system benefits from the speed of calculation of the processor incorporating the device for the evaluation of trigonometric functions for example, which allows improving the accuracy of the servo-control loop.

BRIEF DESCRIPTION OF THE DRAWINGS

Other advantages and features will become apparent on examining the detailed description of embodiments and implementations, which are in no way limiting, and of the appended drawings in which.

DETAILED DESCRIPTION OF ILLUSTRATIVE EMBODIMENTS

Figure 1:
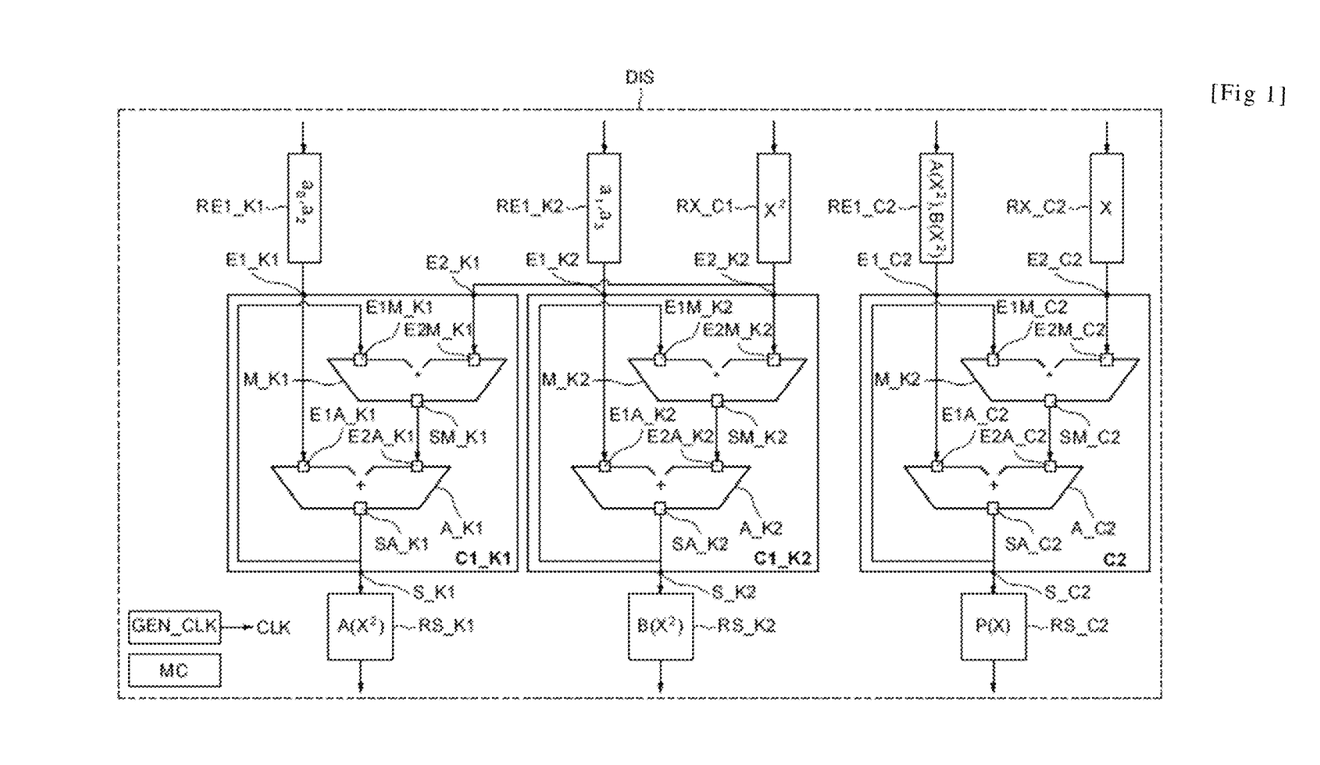
FIG. 1 illustrates a device, in accordance with some embodiments.

FIG. 1 schematically illustrates a device DIS comprising K first circuits C1_K1, C1_K2 (herein K=2) in parallel, a second circuit C2, and a controller MC, for example made in the form of a logic circuit.

The device DIS comprises GEN_CLK clock generator configured to generate a clock signal CLK clocking the first two circuits C1_K1, C1_K2, the second circuit C2 and the controller MC.

The device DIS comprises in relation to the first circuits C1_K1, C1_K2, a first input register RE1_K1, a second input register RE1_K2, a first output register RS_K1, a second output register RS_K2, and a first shared register RX_C1.

The device DIS also comprises, in relation to the second circuit C2, a third input register RE1_C2, a third output register RS_C2, and a second shared register RX_C2.

The device DIS is configured to evaluate the value of a polynomial of degree N and variable X, for a value of the variable X.

In the illustrated example, the polynomial to be evaluated is a polynomial of degree three (N=3) having a general form of the type $P(X)=a_0+a_1X+a_2X^2+a_3X^3$.

This polynomial therefore comprises four coefficients (N+1=4) which are distinguished by their ranks. The index of a coefficient which is equal to the degree of the variable with which it is associated is called "rank of a coefficient".

For the sake of simplicity and brevity, the polynomial selected in the example of FIG. 1 is of degree three, nevertheless the greater the degree N of the selected polynomial, the more advantageous the device DIS is compared to other devices.

Some coefficients of the polynomial can be zero.

The first two circuits C1_K1, C1_K2 are configured to simultaneously implement two Horner methods for two sub-polynomials of variable $X^2$ so as to deliver two output results corresponding to the evaluation values of the two sub-polynomials for the value of the variable $X^2$.

Each of the sub-polynomials comprises a group of G (G=(N+1)/K) coefficients of the polynomial. Within a group of coefficients of a sub-polynomial, the coefficients have ranks which are mutually offset by two. Each group comprises herein two coefficients (G=2). Each sub-polynomial is herein of degree one for the variable $X^2$.

The first circuit C1_K1, on the left in the Figure, is configured to evaluate a sub-polynomia $A(t)=a_0+a_2t$ for the variable $t=X^2$, i.e. to deliver the result of the evaluation of $A(X^2)$.

The first circuit C1_K2, on the right in the Figure, is configured to evaluate a sub-polynomial $B(t)=a_1+a_3t$ for the variable $t=X^2$, i.e. to deliver the result of the evaluation of $B(X^2)$.

To this end, the first left circuit C1_K1 has a first input E1_K1 intended to receive a first group of two coefficients $a_0$, $a_2$ of the polynomial P(X), a second input E2_K1 intended to receive the value of the variable $X^2$, and an output S_K1 on which the result of the evaluation of the sub-polynomial $A(X^2)$ is intended to be delivered.

In parallel, the first right circuit C1_K2 has a first input E1_K2 intended to receive a second group of two coefficients $a_1$, $a_3$ of the polynomial P(X), a second input E2_K2 intended to receive the value of the variable $X^2$, and an output S_K2 on which the result of the evaluation of the second sub-polynomial $B(X^2)$ is intended to be delivered.

The first input register RE1_K1 is connected to the first input E1_K1 of the first left circuit C1_K1 and the second input register RE1_K2 is connected to the first input E1_K2 of the first right circuit C1_K2.

The first output register RS_K1 is connected to the output S_K1 of the first left circuit C1_K1 and the second output register RS_K2 is connected to the output S_K2 of the first right circuit C1_K2.

The first shared register RX_C1 is connected to the second inputs E2_K1 and E2_K2 of the first two circuits C1_K1, C1_K2.

Each first circuit C1_K2, C1_K2, comprises a first adder AK_1, AK_2 and a first multiplier M_K1, M_K2.

Each first adder A_K1, AK2 has a first input E1A_1, E1A_K2 connected to the first input E1_K1, E1_K2 of the first corresponding circuit.

Each first adder A_K1, AK2 comprises an output SA_K1, SA_K2 connected to the output S_K1, S_K2 of the first corresponding circuit.

This output S_K1, S_K2 is looped back onto a first input E1M_K1, E1M_K2 of one of the first multipliers M_K1, M_K2.

Each first multiplier M_K1, M_K2 has a second input E2M_K1, E2M_K2 connected to the second input E2_K1, E2_K2 of the first corresponding circuit.

Each first multiplier M_K1, M_K2 comprises an output SM_K1, SM_K2 connected to the second input E2A_K1, E2A_K2 of the first adder A_K1, A_K2.

The evaluation of the sub-polynomials by the first circuits C1_K1, C2_K2 is simultaneously performed by successive iterations.

The term "iteration" means a step of calculating the first circuits C1_K1, C1_K2 comprising a number of cycles of the clock signal CLK sufficient to obtain a new result on all outputs S_K1, S_K2 of the first circuits C1_K1, C2_K2. For example, all iterations can comprise the same number of cycles of the clock signal CLK. Each iteration can, for example, comprise a single cycle of the clock signal CLK.

During the evaluation of the sub-polynomials, the first inputs of the first adders A_K1, A_K2 simultaneously receive the values of the coefficients of the sub-polynomials by decreasing ranks at each iteration, and the second inputs of the first multipliers M_K1, M_K2 receive the variable $X^K$, herein $X^2$.

All values of the coefficients of the polynomial to be evaluated are known in advance and for example stored in a memory. If for a given rank the value of a coefficient is zero, then a zero value is received at the input of the first corresponding adder A_K1. or A_K2.

The operation of the device of FIG. 1 will be described now.

The first inputs of the first adders A_K1, A_K2, and the inputs of the first multipliers M_K1, M_K2 are initialized to zero.

A first iteration then begins on a first edge of the clock signal CLK.

The controller MC loads the coefficient $a_2$ in the first input register RE1_K1, the coefficient $a_3$ in the second input register RE1_K2, and the value of the variable $X^2$ in the first shared register RX_C1.

The first input E1_K1 of the first left circuit C1_K1 receives the coefficient $a_2$, the first input E1_K1. of the first right circuit C1_K2 receives the coefficient $a_3$, and the second inputs E2_K1, E2_K2 of the first corresponding circuits C1_K1, C1_K2 receive the variable $X^2$.

The outputs SM_K1, SM K2 of the first multipliers M_K1, M_K2 give zero and the outputs SA_K1, SA_K2 of the first adders A_K1, A_K2 give respectively the value of the coefficient $a_2$ and the value of the coefficient $a_3$.

At the end of the first iteration, the first adders A_K1, A_K2 deliver intermediate output results from the first circuits C1_K1, C1_K2. The value of the coefficient $a_2$ is delivered on the output S_K1 of the first left circuit C1_K1 and the value of the coefficient $a_3$ is delivered on the output S_K2 of the first right circuit C1_K2.

A second iteration begins on a second edge of the clock signal CLK, the controller MC loads the coefficient $a_0$ into the first input register RE1_K1, the coefficient $a_1$ into the second input register RE1_K2, and the value of the variable $X^2$ in the first shared register RX_C1.

The first input E1_K1. of the first left circuit C1_K1 receives the coefficient $\alpha_0$, the first input E1_K1. of the first right circuit C1_K2 receives the coefficient $a_1$ and the second inputs E2_K1, E2_K2 of the first corresponding circuits C1_K1, C1_K2 receive the variable $X^2$.

The first inputs E1M_K1, E1M_K1. of the first multipliers M_K1, M_K2 receive the intermediate output results of the corresponding first circuits C1_K1, C1_K2.

Thus the first input E1M_K1 of the first multiplier M_K1 of the first left circuit C1_K1 receives the value $a_2$ and the first input E1M_K1 of the first multiplier M_K1 of the first circuit on the right C1_K2 receives the value $a_3$.

The outputs SM_K1, SM_K2 of the first multipliers M_K1, M_K2 give respectively the value $a_2 X^2$ and the value $a_3 X^2$, and the outputs SA_K1, SA_K2 of the first adders A_K1, A_K2 give respectively the value $A(X^2)$ and the value $B(X^2)$.

At the end of the second iteration, the first adders A_K1, A_K2 deliver the output results of the first circuits C1_K, C2_K on the corresponding outputs S_K1, S_K2. The first left circuit C1_K1 delivers the value of $A(X^2)$ on the associated output S_K1 and the first right circuit C1_K2 delivers the value of $B(X^2)$ on the associated output S_K2.

The controller MC is configured to transfer the output results from the output registers of the first circuits C1_K1, C1_K2 to the input register RE1_C2 of the second circuit C2.

The second circuit C2 is configured to process the two output results $A(X^2)$, $B(X^2)$ of the first circuits C1_K1, C1_K2 so as to deliver the value of the polynomial P(X).

In particular, the second circuit C2 is configured to implement a Homer method to evaluate a reformulation of the expression of the initial polynomial by noting that $P(X)=A(X^2)+XB(X^2)$.

To this end, the second circuit C2 has a first input E1_C2 to successively receive the output results of the first two circuits, starting with the output result $B(X^2)$ of the first right circuit C1_K2 (which processed the highest rank coefficient $a_3$) then by the output result A ($X^2$) of the first left circuit C1_K1.

The second circuit C2 also comprises a second input E2_C2 to receive the variable X, and an output S_C2 to deliver the value of the polynomial.

The third input register RE1_C2 is connected to the first input E1_C2 of the second circuit C2.

The third output register RS_C2 is connected to the output S_C2 of the second circuit C2.

The second shared register RX_C2 is connected to the second input E2_K1 of the second circuit C2.

The second circuit C2 further comprises a second adder A_C2 having a first input E1A_C2 connected to the first input E1_C2 of the second circuit.

The second adder A_C2 comprises an output SA_C2 connected to the output S_C2 of the second circuit.

The output of the second adder A_C2 is looped back onto a first input E1M_C2 of a second multiplier M_C2.

The second multiplier M_C2 has a second input E2M_C2 connected to the second input E2_C2 of the second circuit C2.

An output SA_C2 of the second multiplier M_C2 is connected to a second input E2A_C2 of the second adder A_C2.

The second circuit C2 delivers the value of the polynomial in two successive iterations after the second iteration of the first circuits C1_K1, C2_K2.

The first inputs of the second adder A_C2 and the inputs of the second multiplier M_C2 are initialized to zero.

A third iteration begins on a third edge of the clock signal CLK, the controller MC loads the output result $B(X^2)$ of the first right circuit C1_K2 into the third input register RE1_C2, and the value of the variable X in the second shared register RX_C2.

The first input E1_C2 of the second circuit C2 receives the output result $B(X^2)$ of the first right circuit C1_K2, and the second input E2_C2 of the second circuit C2 receives the variable X.

At the end of the third iteration, the second adder A_C2 delivers the value $B(X^2)$ on the output S_C2 of the second circuit C2.

A fourth iteration begins on a fourth edge of the clock signal CLK, the controller MC loads the output result $A(X^2)$ of the first left circuit C1_K1 into the third input register RE1_C2, and the value of the variable X in the second shared register RX_C2.

The first input E1_C2 of the second circuit C2 receives the output result $A(X^2)$ from the first left circuit and the second input E2_C2 of the second circuit C2 receives the variable X.

At the end of the fourth iteration, the second adder A_C2 delivers a value of the polynomial $P(X)=A(X^2)+XB(X^2)$ on the output S_C2 of the second circuit C2.

Figure 2:
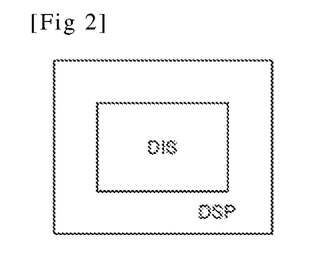
FIG. 2 illustrates a digital signal processor, in accordance with some embodiments.

Although the first circuits C1_K1, C1_K2 and the second circuit C2 have been described above as being distinct circuits, nevertheless it is advantageously possible to use one of the first circuits to carry out the functions of the second circuit C2, for example when the device DIS is incorporated into a signal processing processor DSP (FIG. 2).

Indeed, the second circuit C2 advantageously has a structure similar to the structure of each first circuit C1_K1, C1_K2.

In addition, as previously described above, the iterations implemented by the second circuit C2 to obtain the value of the polynomial are carried out only after the end of the iterations implemented by the first circuits C1 to obtain the output results.

When the second circuit C2 is one of the first circuits C1_K1, C1_K2, the controller MC are configured to handle contents stored in the output registers of the first circuits C1_K1, C1_K2, such that during the third and fourth iterations the output results of the first circuits are fed back into the first input register connected to the first input of the first circuit acting as a second circuit C2.

Likewise, when the second circuit C2 is one of the first circuits, the first shared register RX_C1 is the second shared register RX_C2.

The first shared register then stores the value of the variable $X^2$ during the first and second iteration and stores the variable X during the third and fourth iteration.

Figure 3:
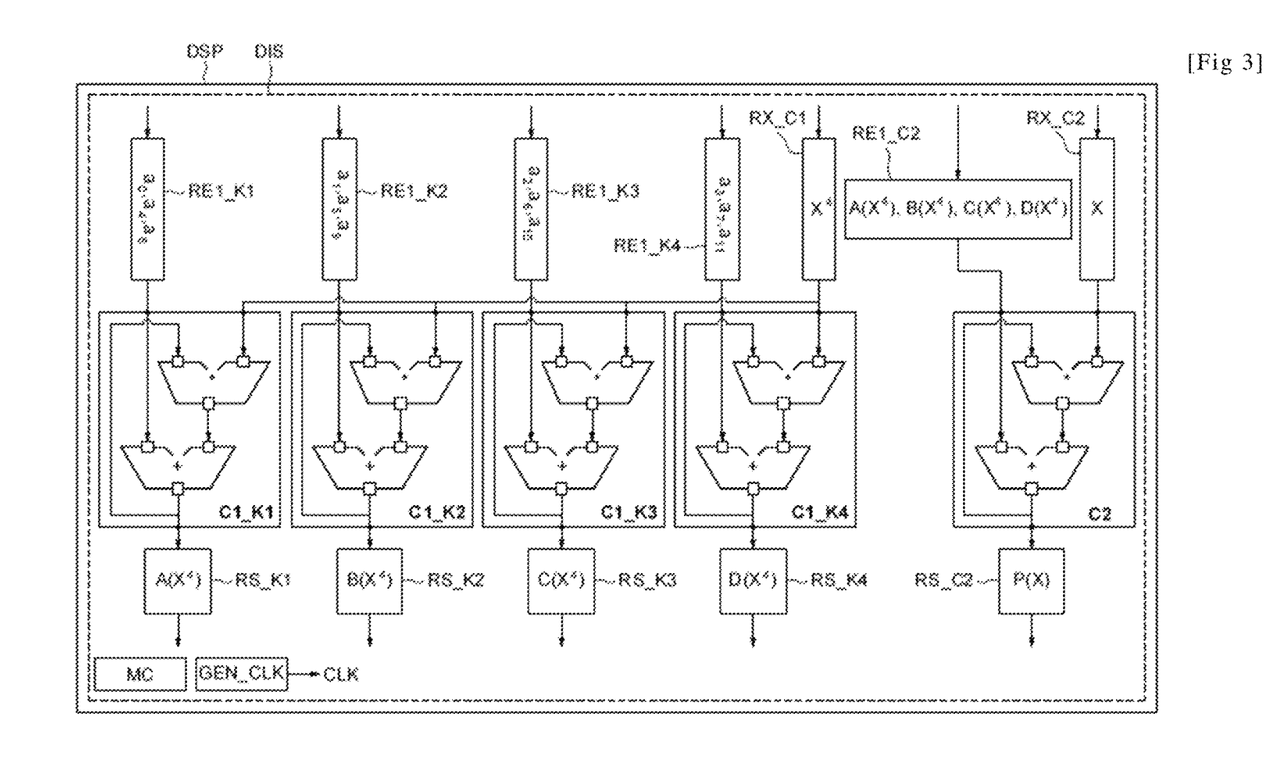
FIG. 3 illustrates a digital signal processor, in accordance with some other embodiments.

FIG. 3 schematically illustrates a signal processing processor DSP comprising a device DIS having herein four first circuits C1_K1, C1_K2, C1_K3, C1_K4 in parallel and a second circuit C2.

Again, although the second circuit C2 has been represented separately, it is advantageously functionally formed by one of the first four circuits C1_Ki.

The signal processing processor DSP in FIG. 3 allows quickly evaluating high degree polynomials.

Indeed, the greater the number K of first circuits, the more a high degree polynomial is subdivided into a large number K of sub-polynomials, which is advantageous in order to accelerate the calculation of the value of the polynomial P.

In the example of FIG. 3, the polynomial to be evaluated is a polynomial of degree eleven (N=11) of a general form of the type $P(X)=a_0+a_1X+a_2X^2+a_3X^3+a_4X^4+a_5X^5+a_6X^6+a_7X^7+a_8X^8+a_9X^9+a_{10}X^{10}+a_{11}X^{11}$. This polynomial therefore comprises twelve coefficients (N+1=12).

The first four circuits C1_K1, C1_K2, C1_K3, C1_K4 are configured to simultaneously implement four Horner methods for four sub-polynomials and deliver four evaluation output results of these four sub-polynomials.

The first circuit C1_K1, on the left in the Figure, is configured to evaluate a sub-polynomial $A(t)=a_0+a_4t+a_8t^2$ for the variable $t=X^4$, i.e. to deliver the result of the evaluation of $A(X^4)$.

The first circuit C1_K2, in the middle on the left in the Figure, is configured to evaluate a sub-polynomial $B(t)=a_1+a_5t+a_9t^2$ for the variable $t=X^4$, i.e. to deliver the result of the evaluation of $B(X^4)$.

The first circuit C1_K3, in the middle on the right in the Figure, is configured to evaluate a sub-polynomial $C(t)=a_2+a_6t+a_{10}t^2$ for the variable $t=X^4$, i.e. to deliver the result of the evaluation of $C(X^4)$.

The first circuit C1_K4, on the right in the Figure, is configured to evaluate a sub-polynomial $D(t)=a_3+a_7t+a_{11}t^2$ for the variable $t=X^4$, i.e. to deliver the result of the evaluation of $D(X^4)$.

The second circuit C2 is configured to process the output results $A(X^4)$, $B(X^4)$, $C(X^4)$, $D(X^4)$ of the first circuits C1_K1, C1_K2, C1_K3, C1_K4 so as to deliver the value of the polynomial P(X).

In particular, the second circuit C2 is configured to implement a Homer method to evaluate a reformulation of the expression of the initial polynomial by noting that $P(X)=A(X^4)+XB(X^4)+X^2C(X^4)+X^3C(X^4)$.

The device DIS comprises for each of the first circuits a first input register RE1_K1, RE1_K2, RE1_K3, RE1_K4 intended to successively store the coefficients of the polynomial P(X) and an output register RS_K1, RS_K2, RS_K3, RS_K4 to store the output results $A(X^4)$, $B(X^4)$, $C(X^4)$, $D(X^4)$.

Each of the first circuits comprises a second input connected with the same shared register RX_C1 in particular adapted to store the value of the variable $X^K$, herein $X^4$.

The second circuit C2 comprises a first input connected to a third input register RE1_C2 intended to successively store the output results $D(X^4)$, $C(X^4)$, $B(X^4)$, $A(X^4)$d in the reverse order of the first circuits, that is to say starting with the output result $D(X^4)$ of the first right circuit C1_K4 which processed the highest rank coefficient $a_{11}$.

The second circuit C2 comprises a second input connected to a fourth input register RX_C2 intended to store the value of the variable X.

The operation of the first circuits C1_K1, C1_K2, C1_K3, C1_K4 is analogous to the operation described in relation to FIG. 1. Likewise, the operation of the second circuit C2 is analogous to the operation described in relation to FIG. 1.

At the end of the iterative calculation performed by the device DIS, the value of the polynomial P(X) is contained in the output register RS_C2.

Figure 4:
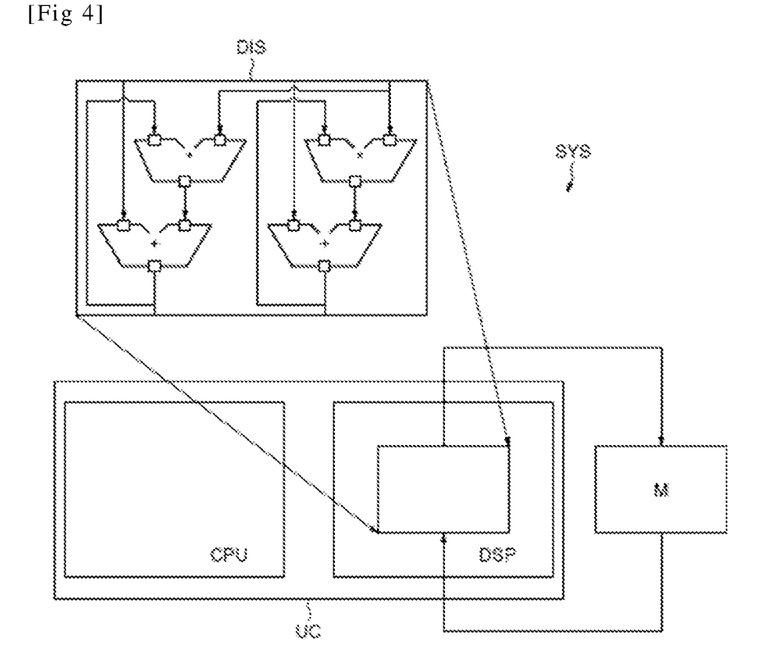
FIG. 4 illustrates a servo-control system, in accordance with some other embodiments.

FIG. 4 illustrates a servo-control system SYS comprising a servo-control loop integrating a control unit UC, for example a microcontroller such as that marketed by the company STMicroelectronics under the reference STM32, connected to an electric motor M.

The control unit UC comprises a processing unit CPU and a signal processing processor DSP incorporating the device DIS described above to implement a servo-control of the electric motor M.

For the servo-control of the motor, it may for example be advantageous to evaluate a sine or cosine function, in particular in the case of a servo-control of the angle of rotation of the electric motor M.

A polynomial approximating a sine function is for example $\sin(X) \approx P(X) = X(1+X^2(s_1+X^2(s_2+X^2(s_3+X^2(s_4+X^2(s_5+s_6X^2))))))$.

A polynomial approximating a cosine function is for example $\cos(X) \approx P(X) = 1+X^2(c_1+X^2(c_2+X^2(c_3+X^2(c_4+X^2(c_5+c_6X^2)))))$.

Thus, it is therefore advantageous for the servo-control loop to implement the device DIS as described above in order to quickly evaluate the trigonometric function whose value is sought.

What is claimed is:

1. A digital signal processor for evaluating a polynomial of degree N and variable X with N+1 number of coefficients, N being an integer greater than one, the digital signal processor comprising:
K number of first electronic circuits, each first electronic circuit having a corresponding first input, second input, and a first output,
wherein each first electronic circuit is configured to:
receive, at its first input, a group of K number of G number of successive coefficients of the polynomial, K being an integer that is a sub-multiple of N+1 greater than or equal to two, G being an integer that is equal to (N+1)/K, ranks of the G number of successive coefficients within each group of the K number being mutually offset by the number K starting with a highest rank coefficient in the group, the ranks of the G number of successive coefficients received simultaneously at each first input of each first circuit being mutually offset by one, and receive, at its second input, a value of a variable $X^K$, wherein the first electronic circuits are configured to:
simultaneously implement K number of Horner methods on their respective first inputs and respective second inputs, and
deliver K number of output results at their respective first outputs; and a second electronic circuit having a third input, a fourth input, and a second output, the second electronic circuit configured to:
successively receive, at the third input, results of the first electronic circuits starting with a result of the first electronic circuit having processed the highest rank coefficient of the coefficients,
receive, at the fourth input, the variable X,
implement a Horner method on the third input and fourth input, and
deliver, at the second output, a value of the polynomial for the variable X.

2. The digital signal processor of claim 1, wherein each first electronic circuit comprises:
a first multiplier, the first input of the first multiplier coupled to the second input of the first electronic circuit; and
a first adder, the first input of the first adder coupled to the first input of the first electronic circuit, the second input of the first adder coupled to an output of the first multiplier, an output of the first adder coupled to the first output of the first electronic circuit and looped back onto a second input of the first multiplier.

3. The digital signal processor of claim 2, wherein the second electronic circuit comprises:
a second multiplier, a first input of the second multiplier coupled to the fourth input of the second electronic circuit; and
a second adder, a first input of the second adder coupled to the third input of the second electronic circuit, a second input of the second adder coupled to an output of the second multiplier, an output of the second adder coupled to the second output of the second electronic circuit and looped back onto a second input of the second multiplier.

4. The digital signal processor of claim 1, wherein the second electronic circuit is one of the first electronic circuits.

5. The digital signal processor of claim 1, wherein the second electronic circuit is different from each of the first electronic circuits.

6. The digital signal processor of claim 1, wherein N equals 3, the number of coefficients equals 4, the polynomial is of degree 3, K equals two, and G equals 2.

7. The digital signal processor of claim 1, wherein N equals 11, the number of coefficients equals 12, the polynomial is of degree 11, K equals four, and G equals 3.

8. A digital signal processor comprising:
a first circuit configured to receive a first sub-polynomial of an input polynomial, evaluate the first sub-polynomial with a first Horner method, and output a first intermediate result of evaluating the first sub-polynomial;
a second circuit configured to receive a second sub-polynomial of the input polynomial, evaluate the second sub-polynomial with a second Horner method, and output a second intermediate result of evaluating the second sub-polynomial, wherein the first Horner method and the second Horner method are simultaneously implemented; and
a third circuit configured to receive the first intermediate result and the second intermediate result, evaluate the first intermediate result and the second intermediate result with a third Horner method to produce a final result of evaluating the input polynomial, and output the final result.

9. The digital signal processor of claim 8, wherein the final result is a result of evaluating the input polynomial for a value, and the first sub-polynomial and the second sub-polynomial are of degree one for the value squared.

10. The digital signal processor of claim 8, wherein the first circuit is configured to receive the first sub-polynomial by receiving first coefficients in a first input register for the first circuit, the second circuit is configured to receive the second sub-polynomial by receiving second coefficients in a second input register for the second circuit, and the first coefficients and the second coefficients have ranks that are mutually offset by two.

11. The digital signal processor of claim 10 further comprising a control circuit configured to:
load the first coefficients in the first input register during a first iteration;
load the second coefficients in the second input register during a second iteration; and
load the first intermediate result and the second intermediate result in a third input register for the third circuit during a third iteration.

12. The digital signal processor of claim 8, wherein the first circuit comprises a first adder and a first multiplier, and the second circuit comprises a second adder and a second multiplier.

13. The digital signal processor of claim 12, wherein the third circuit comprises a third adder and a third multiplier.

14. The digital signal processor of claim 12, wherein the third circuit comprises the second adder and the second multiplier.

15. A servo-control system, comprising:
an electric motor;
a servo-control loop coupled to the electric motor, the servo-control loop comprising a digital signal processor for evaluating a polynomial of degree N and variable X with N+1 number of coefficients, N being an integer greater than one, the digital signal processor comprising:
K number of first electronic circuits, each first electronic circuit having a corresponding first input, second input, and a first output,
wherein each first electronic circuit is configured to:
receive, at its first input, a group of K number of G number of successive coefficients of the polynomial, K being an integer that is a sub-multiple of N+1 greater than or equal to two, G being an integer that is equal to (N+1)/K, ranks of the G number of successive coefficients within each group of the K number being mutually offset by the number K starting with a highest rank coefficient in the group, the ranks of the G number of successive coefficients received simultaneously at each first input of each first circuit being mutually offset by one, and
receive, at its second input, a value of a variable $X^K$, wherein the first electronic circuits are configured to:
simultaneously implement K number of Horner methods on their respective first inputs and respective second inputs, and
deliver K number of output results at their respective first outputs; and a second electronic circuit having a third input, a fourth input, and a second output,
wherein the second electronic circuit is configured to:
successively receive, at the third input, results of the first electronic circuits starting with a result of the first electronic circuit having processed the highest rank coefficient of the coefficients,
receive, at the fourth input, the variable X,
implement a Horner method on the third input and fourth input, and
deliver, at the second output, a value of the polynomial for the variable X.

16. The servo-control system of claim 15, wherein the polynomial approximates a sine function, and wherein the servo-control loop is configured to control an angle of rotation of the electric motor.

17. The servo-control system of claim 15, wherein each first electronic circuit comprises:
a first multiplier, the first input of the first multiplier coupled to the second input of the first electronic circuit; and
a first adder, the first input of the first adder coupled to the first input of the first electronic circuit, the second input of the first adder coupled to an output of the first multiplier, an output of the first adder coupled to the first output of the first electronic circuit and looped back onto a second input of the first multiplier.

18. The servo-control system of claim 15, wherein the second electronic circuit comprises:
a second multiplier, a first input of the second multiplier coupled to the fourth input of the second electronic circuit; and
a second adder, a first input of the second adder coupled to the third input of the second electronic circuit, a second input of the second adder coupled to an output of the second multiplier, an output of the second adder coupled to the second output of the second electronic circuit and looped back onto a second input of the second multiplier.

19. The servo-control system of claim 15, wherein N equals 3, the number of coefficients equals 4, the polynomial is of degree 3, K equals 2, and G equals 2.

20. The servo-control system of claim 15, wherein N equals 11, the number of coefficients equals 12, the polynomial is of degree 11, K equals 4, and G equals 3.

* * * * *